Inventor
WALTER O. KRAUSE

INVENTOR
WALTER O. KRAUSE

ATTORNEYS

United States Patent Office 3,548,639
Patented Dec. 22, 1970

3,548,639
BROMIDE-CHLORIDE SALT MOISTURE INDICATING COMPOSITION
Walter O. Krause, Chesapeake, Va., assignor to Virginia Chemicals Inc., West Norfolk, Va., a corporation of Virginia
Original application Aug. 19, 1968, Ser. No. 753,655, now Patent No. 3,499,316, dated Mar. 10, 1970. Divided and this application Sept. 9, 1969, Ser. No. 870,339
Int. Cl. G01n 33/00; C01g 51/08
U.S. Cl. 73—61.1                                    2 Claims

ABSTRACT OF THE DISCLOSURE

Moisture-indicating materials of the type used in refrigerant systems to detect moisture content which may have a deleterious effect upon the system capabilities, particularly a mixed salt consisting of cobaltous bromide and either barium chloride or magnesium chloride. The moisture indicator composition undergoes a reversible color change as wetted, indicating the degree of moisture within the refrigerant system.

CROSS-REFERENCES TO RELATED APPLICATIONS

A division of Dual Salt Moisture-Indicating Composition (Ser. No. 753,655), filed Aug. 19, 1968, now Pat. No. 3,499,316, Mar. 10, 1970.

BACKGROUND OF THE INVENTION

(1) Field of the invention

In refrigerant systems and related liquid systems, a great deal of recent attention has been given to the detection of water or moisture content which has a deleterious effect upon system capabilities. Cobaltous bromide has been employed as an impregnant for glass fiber or paper. Cobaltous bromide itself undergoes a dominant color change from green to pink, as it becomes saturated with water. However, the color change of cobaltous bromide is fairly finite with respect to the percentage of water detected, that is the cobaltous bromide rapidly completes its color change within a narrow percentage range of moisture. Accordingly, attention has been given to developing related compositions which would have variant color indicating characteristics as system needs dictate.

(2) Description of the prior art

Cobaltous bromide moisture indicators may be positioned in a moisture indicator housing, of the type illustrated and claimed in Pat. 3,085,424 and assigned to assignee herein. The liquid phase indicator may be of a cobaltous bromide type applied to a mat of inert fibers, as disclosed in Pat. No. 2,836,974 or, as applied to a cellulosic paper, as set forth in Pat. 2,76,312. In both cases the color indicators were used in refrigerant systems having a refrigerant liquid of low water solubility.

A principal prior art teaching of the employment of salts such as magnesium chloride, calcium chloride and aluminum chloride together with cobalt chloride is set forth in Applied Biology (M. E. Solomon): "The Use of Cobalt Salts as Indicators of Humidity and Moisture," pages 75–85.

SUMMARY OF THE INVENTION

According to the present invention the color indicating characteristics of the cobalt salt are considerably varied by employing dual salts such as the following:

(1) cobaltous acetate with another acetate salt;
(2) cobaltous bromide with bromides of barium or magnesium; and
(3) dual bromide salt combinations, such as cobaltous bromide and a bromide salt of zinc, cadmium or mercury.

The color change results thus achieved, are illustrated in FIGS. 1, 2, 3, 4, 5, and 6.

DESCRIPTION OF THE PREFERRED EMBODIMENTS

Figure 1:
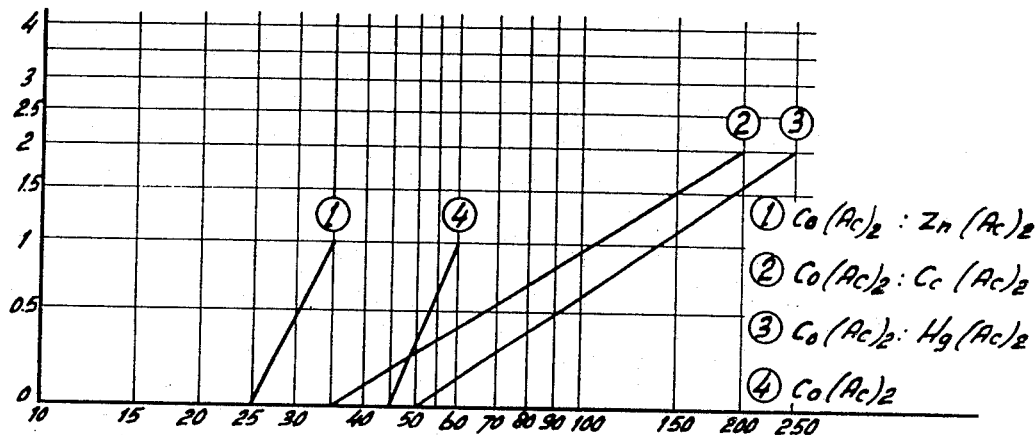
FIG. 1 is a graph depicting approximate color changes by hue of the dual acetate salts: cobaltous acetate and acetate zinc, cadmium and mercury, as affected by water content.

Free and dissolved water in refrigeration systems has always been a major problem. The presence of moisture in these systems can lead to some undesirable effects such as:

(1) Chemical reaction with oil or refrigerant to form acidic materials, tars and varnishes.
(2) Clogging of metering devices due to "freeze up."
(3) Lowering of the dielectric of motor insulation in hermetic and semihermetic motors resulting in motor failure.
(4) Enhanced probability for copper plating.

As a result, manufacturers of refrigeration equipment as well as the installing contractor and service engineer carry out expensive and/or time consuming procedures to obtain the degree of internal dryness which leads to reliable and prolonged system operation. These procedures generally consist of high vacuum techniques combined with elevated temperatures. However, even when these techniques are followed, the concentration of moisture in the system cannot be specifically determined unless expensive and time consuming analytical techniques are used. Some manufacturers carry out these procedures on a small segment of their daily production to assure themselves that their manufacturing procedures are conforming to expectations. Further, dehydrators containing desiccating materials are installed for further protection.

Since analysis of each assembly is economically unfeasible to the manufacture and impossible for field assembled equipment, moisture indicators have been used. These indicators reversibly change color with changes in relative saturation of water dissolved in a particular refrigerant.

The working portion of these indicators generally consist of a cobalt salt, preferable cobalt bromide, deposited on paper or some other material such as a polyester or fiber glass.

The relative concentration of the cobalt salt to the cellulose or paper base material is held so that a significant change in color is obtained when the relative saturation of water in refrigerant reaches 4 to 5% of complete saturation. Generally no further color change occurs after the relative saturation reaches about 17%. The color obtained below 5% relative saturation is considered the "dry" color while that obtained above 17% is considered the "wet" color. It is postulated that the cellulose-cobalt bromide forms a complex salt with different characteristics than the cobalt salt alone.

When no complex is formed such as a polyester cobalt bromide color changes occur at a lower relative saturation of water in refrigerants. This change occurs at about 1.2 to 2.4% relative saturation with the "wet" color occurring above 2.4% and the "dry" color below 1.2% relative saturation. The degree of sensitivity to low dissolved moisture levels is desirable in many cases. This is especially true when proper dehydration of equipment has been carried out. These systems, then, have an extremely low concentration of moisture in the circulating refrigerant when first placed into operation. Later, through normal or but generally adverse operating conditions deterioration of the organic constituents such as oil or motor insulation water is formed and the concentration of dissolved water rises. If deterioration should continue equipment failure will result. Accordingly, a monitoring system such as a moisture indicator changing color at low moisture levels is vital. Should color change occur proper procedure can be taken to correct the adverse conditions.

Under a given set of operating conditions, system sensitivity to chemical or thermal deterioration varies with selection of components making up the motor compressor. Some components are more sensitive than others to the environment and depending upon their chemical nature contribute more or less water to the system during deterioration. The amount of material used also bears on the quantity of water contributed to the system.

Considering moisture increase in a system as an indication of chemical deterioration, a moisture indicator changing from a "dry" to a "wet" color would signal that this deterioration is occurring. With systems of varying sensitivities and ability to create water, moisture indicators should be designed for specific refrigeration systems. Rather, standardized moisture indicators are applied to any and all systems. By changing the ratio of cobaltous bromide to the paper base the standard indicators can be made to show color shifts between narrow limits.

Indicators can be prepared that will show color changes at high moisture levels or at low moisture levels. This can be done by the addition of water soluble salts of metals in Group II-A and II-B in the periodic table to cobaltous bromide. Furthermore, other cobaltous salts such as the nitrate, acetate and sulfate with cobalt chloride and bromide have a color change shifting effect. Addition of Group II-B salts to the cobaltous bromide or chloride sensitizes the moisture indicator—that is—color shifts from "dry" to "wet" occur at a lower water concentration level. On the other hand, salts of Group II-A have the opposite effect.

By varying the ratio of one salt to another and/or by varying the ratio of salt mixture to the paper base one can obtain moisture indicators, with color shifts in any desired range depending upon the requirements of the refrigeration system to which it is applied.

The moisture indicators are prepared by immersing unsized paper, such as Whatman No. 1 laboratory grade filter paper in the solution of the salts. The solutions are controlled very specifically with regard to normal concentrations of the salts as well as the ratio of concentration of one salt to another.

After drying the treated paper, the paper can be cut to various geometric configurations to be mounted in a hermetic device having a sight glass and proper fittings for installation in refrigeration systems. The color change of the indicator with changing concentrations of dissolved water in the refrigerant can be observed through the sight glass.

Figure 2:
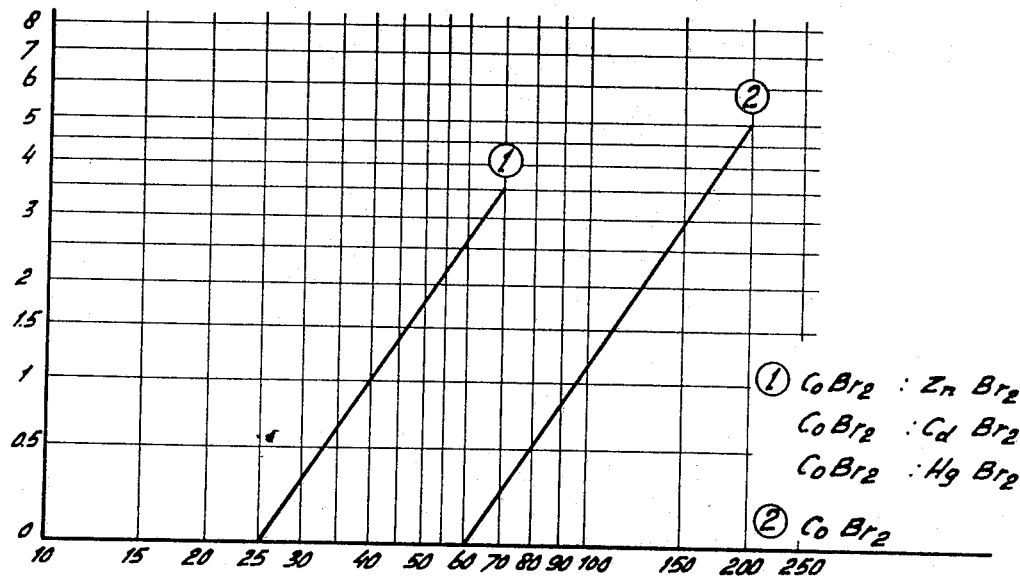
FIG. 2 is a corresponding graph of the dual bromide salts: cobaltous bromide and bromide of zinc, cadmium and mercury.
Figure 3:
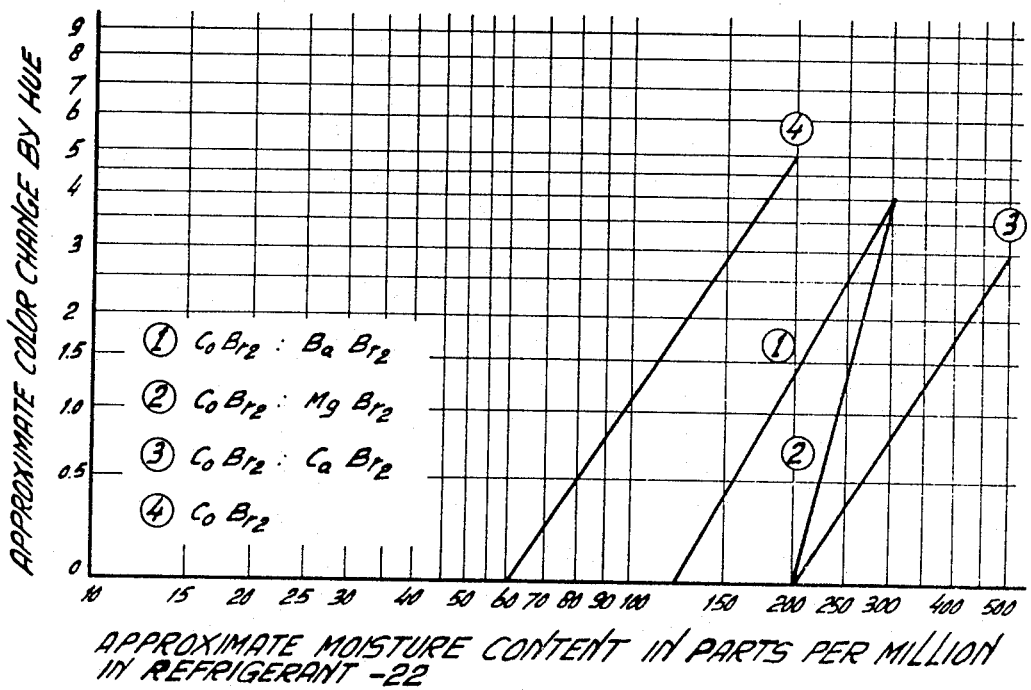
FIG. 3 is a like graph of the dual bromide salts: cobaltous bromide and bromide of barium, magnesium and cadmium.
Figure 4:
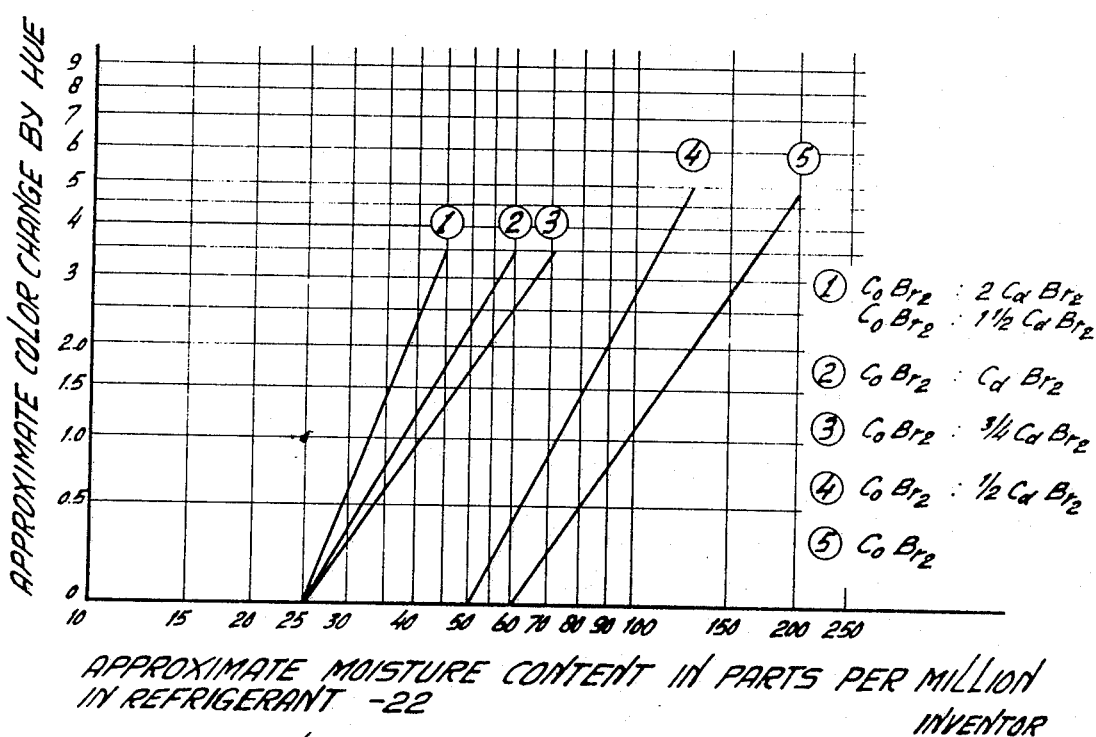
FIG. 4 is a graph depicting approximate color change by hue with the increasing of the ratio of cadmium bromide to cobalt bromide.
Figure 5:
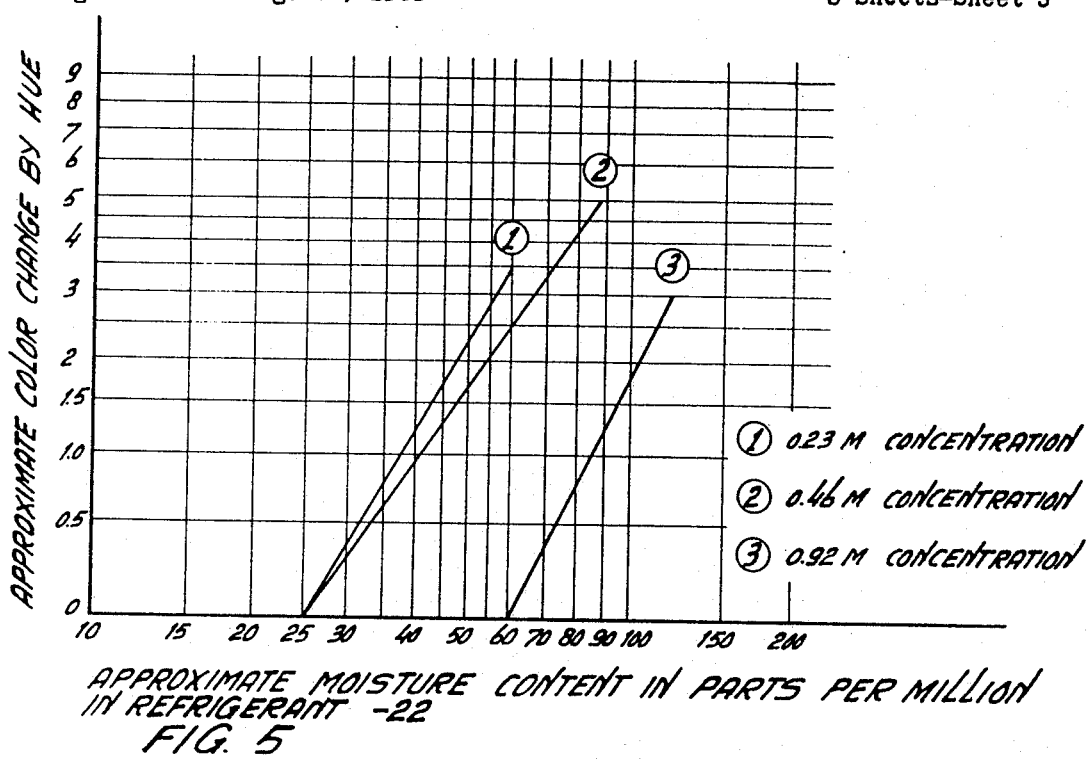
FIG. 5 is a graph depicting approximate color change by hue with the increasing of the salt concentration.
Figure 6:
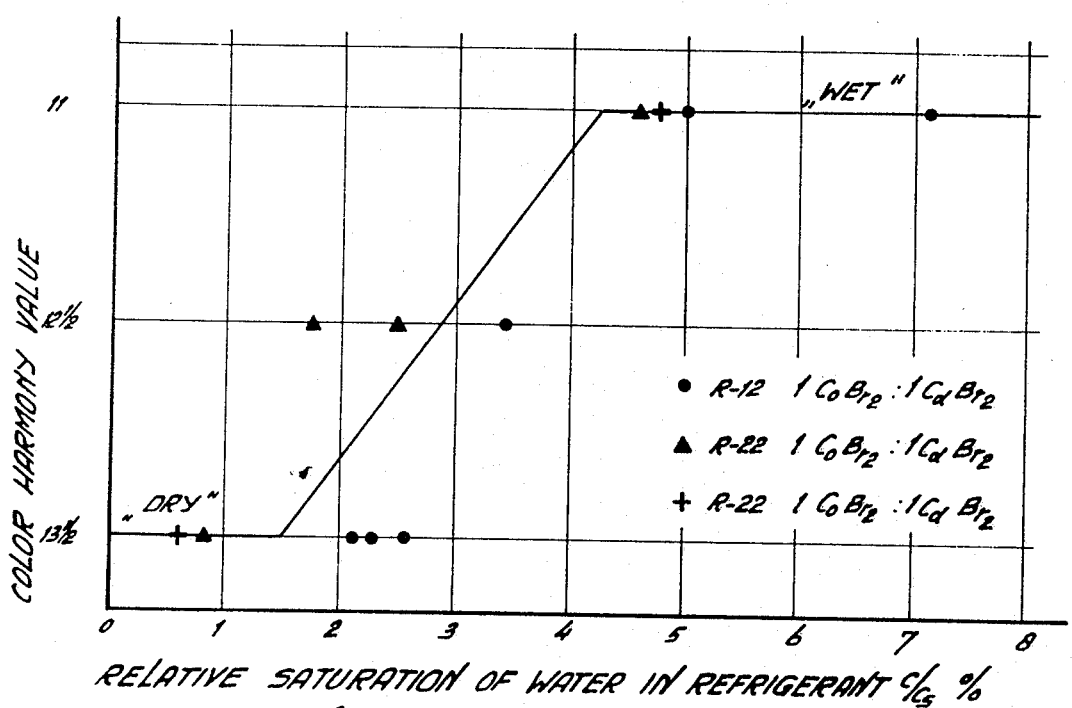
FIG. 6 is a graph depicting approximate color changes of the cobaltous bromide-cadmium bromide indicator in operating refrigeration units.

Examples of some of the various types of moisture indicator combinations are shown in the graphs FIGS. 1–6. For simplicity purposes the color changes are shown as change by hue rather than specific colors since the "dry" color is not always at the same hue. For example, the "dry" color for a cobaltous bromide based indicator has a Color Harmony Value of 15 ic while an indicator prepared with cobalt chloride mercuric chloride has a Color Harmony Value of 12½ gc in its "dry" state.

The base line of the graphs is considered as the color of the indicator in its "dry" state. This color is generally a blue color. The graph shows the indicator going through its intermediate stages of lavendar, lilac, etc. The termination point of each graph line is that point at which a definite pink or "wet" color is reached. This is generally equivalent to a Color Harmony Value of 11 ca.

The addition of salts to Group II-B to "sensitize" these elements appears to eliminate the "dry" anhydrous color so that one continuously approaches the "intermediate" colors with increasing amounts (based on the ratio of the two salts) of the II-B salts. In this way the number of hues the indicator must go through to reach the pink or "wet" color, is constantly reduced.

The effect of the addition of the dual salts on the color change characteristics of Whatman No. 1 filter paper are set forth in Tables 1–4 below:

TABLE ONE

[Effect of the Addition of Various Salts on the Color Change Characteristics of Whatman No. 1 Filter Paper Treated with $CoBr_2$]

| | Color Harmony Value | | | | | | | |
|---|---|---|---|---|---|---|---|---|
| | No salt added | $ZnBr_2$ | $CdBr_2$ | $HgBr_2$ | $MgBr_2$ | $CaBr_2$ | $BaBr_2$ | $Li_2Br$ | $Co(NO_3)_2$ |
| Percent $H_2O$ in H-151: | | | | | | | | | |
| 0 | 15 lc | 13½ ec | 13½ ic | 13½ ic | 16 la | 17 la | 16 la | 16 la | 13 lc |
| 1 | 15 lc | 13½ ec | 13½ ic | 13½ ic | 16 la | 17 la | 16 la | 16 la | 13 lc |
| 2 | 15 lc | 13 ec | 13½ ic | 13½ ic | 16 la | 17 la | 16 la | 16 la | 13 ia |
| 3 | 15 ic | 12½ ec | 12½ ge | 12½ ge | 16 la | 17 la | 16 la | 16 la | 13 ic |
| 3.25 | 15 ic | 12½ ec | 12½ ec | 12½ ec | 16 la | 17 la | 16 la | 16 la | 13 ic |
| 3.50 | 15 ic | 12½ ec | 12½ ec | 12½ ec | 16 la | 17 la | 16 la | 16 la | 13 ic |
| 3.75 | 15 ic | 12 ec | 11 ec | 11 ec | 16 ia | 17 ia | 16 ia | 16 ia | 13 ic |
| 4.00 | 15 gc | 12 ec | 11 ec | 11 ec | 16 ia | 17 ia | 16 ia | 16 ia | 13 ic |
| 4.50 | 15 gc | 11 ca | 10 ec | 10 ec | 16 ga | 17 ga | 16 ga | 16 ga | 13 ie |
| 5.00 | 15 gc | 11 ca | 10 ec | 10 ec | 16 ga | 17 ga | 16 ga | 16 ga | 13 ie |
| 6.00 | 14 ec | 7 ca | 7 ca | 7 ca | 16 ga | 17 ga | 16 ga | 16 ga | 13 ge |
| 7.00 | 13 ca | 7 ca | 7 ca | 7 ca | 17 ec | 17 ga | 16 ec | 16 ec | 12 ec |
| 8.00 | 10 cb | 7 ca | 7 ca | 7 ca | 16 ec | 16 ga | 14 ec | 14 ec | 10 ca |
| 9.00 | | | | | 14 ec | 17 ea | 13½ ca | 13 ca | |
| 10.00 | | | | | 13 ca | 17 ca | 12½ ca | 12 ca | |
| 11.00 | | | | | 12 ca | 17 ca | 12 ca | 12 ca | |
| 12.00 | | | | | 12 ca | 14 ca | 12 ca | 12 ca | |
| 13.00 | | | | | 12 ca | 12½ ca | 12 ca | 12 ca | |
| 14.00 | | | | | 12 ca | 12 ca | 12 ca | 12 ca | |

TABLE TWO

[Effect of the Addition of Various Salts on the Color Change Characteristics of Whatman No. 1 Filter Paper with Co(Ac)$_2$]

| Percent H$_2$O in H-151 | Color Harmony Value | | | | |
|---|---|---|---|---|---|
| | Co(Ac)$_2$ | Zn(AC)$_2$ | Cd(Ac)$_2$ | Hg(Ac)$_2$ | Co(NO$_3$)$_2$ |
| 0 | 12 ic | 11 gc | 12 gc | 11 gc | 11 ic |
| 1 | 12 ic | 11 gc | 12 gc | 11 gc | 11 ic |
| 2 | 12 ga | 10 ec | 12 gc | 11 gc | 10 ic |
| 3.00 | 12 ga | 10 ec | 11 gc | 11 ec | 10 ic |
| 3.25 | 12 ga | 10 ec | 11 gc | 11 ec | 10 gc |
| 3.50 | 11 gc | 10 ec | 11 gc | 11 ec | 10 gc |
| 3.75 | 11 gc | 10 ec | 11 ec | 11 ec | 10 gc |
| 4.00 | 11 gc | 10 ec | 11 ec | 10 ec | 10 gc |
| 4.50 | 11 ec | 10 ec | 11 ec | 10 ec | 10 gc |
| 5.00 | 11 ec | 10 ec | 11 ec | 10 ec | 9 gc |
| 6.00 | 11 ec | 10 cb | 10 cb | 10 ec | 9 gc |
| 7.00 | 11 ca | 10 cb | 10 cb | 9 ca | 9 ca |
| 8.00 | 11 ca | 10 cb | 10 cb | 9 ca | 9 ca |

TABLE THREE

[Effect of Increasing the Ratio of Cadmium Bromide to Cobalt Bromide on the Color Change Characteristics of Treated Whatman No. 1 Filter Paper]

| H$_2$O in H-151, percent by wt. | Color Harmony Value | | | | | | | |
|---|---|---|---|---|---|---|---|---|
| | Molar Ratio of CoBr$_2$ to CdBr$_2$ CoBr$_2$=1 | | | | | | | |
| | ½ | ¾ | 1 | 1½ | 2 | 3 | 4 | 5 |
| 0 | 14 ic | 14 ic | 13½ ic | 13½ ic | 13½ gc | 13½ ic | 13 ic | 13 ga |
| 1 | 14 ic | 14 gc | 13½ ic | 13½ gc | 13½ gc | 13 ic | 13 ic | 13 ga |
| 2 | 14 ic | 14 gc | 13½ gc | 14 ec | 14 ec | 12½ ec | 12 ca | 12½ ga |
| 3 | 14 gc | 12½ ec | 12 ec | 12½ ca | 12 ca | 12½ ec | 12 ca | 12 ca |
| 3.25 | 14 gc | 12 ec | 12½ ca | 7 cb | 7 cb | | | |
| 3.50 | 14 gc | 12 ec | 12½ ca | 7 cb | 7 cb | | | |
| 3.75 | 14 ec | 12½ ca | 10 cb | 7 cb | 7 cb | | | |
| 4.00 | 14 ca | 12½ ca | 7 cb | 7 cb | 7 cb | 10 ca | 9 ec | 11 ca |
| 4.50 | 12½ ca | 7 cb | 7 cb | 7 cb | 7 cb | | | |
| 5.00 | 12½ ca | 7 cb | 7 cb | 7 cb | 7 cb | 10 ca | 9 ec | 11 ca |
| 6.00 | 7 cb | 7 cb | 7 cb | 7 cb | 7 cb | 9 ca | 9 ec | 11 ca |

TABLE FOUR

[Effect of Increasing the Salt Concentration in the Color Characteristics of Whatman No. 1 Filter Paper Treated with CoBr$_2$ and CdBr$_2$]

| Percent H$_2$O in H-151 | Color Harmony Value | | |
|---|---|---|---|
| | Amount Salt in 100 ca. H$_2$O, g. | | |
| | 5.00 g. CoBr$_2$; 7.85 g. CdBr$_2$ | 10.00 g. CoBr$_2$; 15.70 g. CdBr$_2$ | 20.00 g. CoBr$_2$; 31.40 g. CdBr$_2$ |
| 0 | 13½ ic | 14 lc | 15 nc |
| 1.00 | 13½ ic | 14 lc | 15 nc |
| 2.00 | 13½ gc | 13 ic | 15 nc |
| 3.00 | 12 ec | 13 ic | 15 nc |
| 3.25 | 12½ ca | 13 ic | 15 nc |
| 3.50 | 12½ ca | 13 ic | 15 nc |
| 3.75 | 10 cp | 12½ gc | 15 nc |
| 4.00 | 7 cb | 12½ gc | 15 nc |
| 4.50 | 7 cb | 11 gc | 12½ ic |
| 5.00 | 7 cb | 11 cc | 12½ ic |
| 6.00 | 7 cb | 9 gc | 12 gc |

TABLE FIVE

[Color Calibration of Dual System Paper Base Moisture Indicators Treated with CoBr$_2$ and CdBr$_2$ CoBr$_2$=0.023M/liter=1]

| R-12 | | | | | |
|---|---|---|---|---|---|
| 0.75 CdBr$_2$ | 0.825 CdBr$_2$ | 1.00 CdBr$_2$ | H$_2$O, p.p.m. | Temp., °F. | C./c$_2$, percent |
| 14 gc | 13½ gc | 13½ gc | 2.6 | 88 | 2.1 |
| 14 gc | 13½ gc | 13½ gc | 2.5 | 84 | 2.3 |
| 14 gc | 13 gc | 13 gc | 2.9 | 84 | 2.6 |
| 12½ cc | 12½ ec | 12½ ec | 3.6 | 83 | 3.4 |
| 13 oc | 11 ec | 11 ec | 6.1 | 76 | 7.1 |
| 12 ca | 11 ec | 11 ec | 11.5 | 78 | 12.5 |
| R-22 | | | | | |
| 13½ ic | 13½ ec | 13½ ic | 9.7 | 74 | 0.80 |
| 13½ gc | 13½ ec | 13½ gc | 10.5 | 74 | 0.85 |
| 13½ gc | 13½ gc | 12½ gc | 19.0 | 74 | 1.54 |
| 13½ ec | 12½ ec | 12½ ec | 21.4 | 74 | 1.73 |
| 13½ ec | 12½ ec | 12½ ec | 22.0 | 74 | 1.79 |
| 13½ ec | 12½ ec | 12½ ec | 30.0 | 74 | 2.46 |
| 12½ ec | 12 ec | 12 ec | 43.3 | 74 | 3.52 |
| 12½ ec | 12 ec | 12 ec | 48.0 | 74 | 3.90 |
| | | 11 ca | 57.0 | 74 | 4.62 |

TABLE FIVE.—Continued

| CoBr$_2$=0.0196M=1 | | | | |
|---|---|---|---|---|
| 0.75 CdBr$_2$ | 1.00 CdBr$_2$ | 1.25 CdBr$_2$ | H$_2$O, p.p.m. | C./c$_2$, percent |
| 13½ ic | 13½ ic | 13 gc | 5.8 | 0.47 |
| 13½ ic | 13½ gc | 13 gc | 7.0; 7.0; 7.1 | 0.57; 0.57; 0.57 |
| 13½ gc | 13½ ic | 13 gc | 8.7; 8.9; 10.3 | 0.70; 0.72 |
| 13 gc | 12½ gc | 12 ec | 16.5; 17.5; 18.0 | 1.35; 1.42; 1.47 |
| 13 ca | 12½ ca | 12 ca | 20.2; 19.6; 19.3 | 1.64; 1.59; 1.57 |
| 12½ ca | 12 ec | 11 ic | 34.6; 35.4; 35.4 | 2.8; 2.9; 3.9 |
| 12½ ec | 12 ec | 11 ca | 61.0; 58.3; 58.3 | 5.0; 4.7; 4.7 |
| 12 ca | 11 ca | 10 ca | 64; 64; 64 | 5.2; 5.2; 5.2 |

Color calibration of a dual salt system involving cobaltous bromide and cadmium bromide is set forth in Table Four and color change points of this dual salt indicator are set forth in Table Five.

Manifestly, the concentration of the dual salts may be varied, as set forth in Tables 4 and 5 and otherwise, without departing from the spirit and scope of invention.

I claim:
1. A dual salt moisture indicating composition comprising:
   (A) a base cellulosic paper impregnated with;
   (B) cobaltous bromide; and
   (C) barium chloride.
2. A dual salt moisture indicating composition comprising:
   (A) a base cellulosic paper impregnated with;
   (B) cobaltous bromide; and
   (C) magnesium chloride.

References Cited

UNITED STATES PATENTS

| 2,460,068 | 1/1949 | Davis | 252—408 |
| 2,460,069 | 1/1949 | Davis | 252—408 |
| 2,526,938 | 10/1950 | Davis et al. | 252—408 |
| 2,761,312 | 9/1956 | Line et al. | 73—61.1 |
| 3,173,880 | 3/1965 | Pappas et al. | 73—61.1X |

LOUIS R. PRINCE, Primary Examiner

J. W. ROSKOS, Assistant Examiner

U.S. Cl. X.R.

23—253, 254; 73—335; 116—114; 252—408